United States Patent Office 3,097,839
Patented July 16, 1963

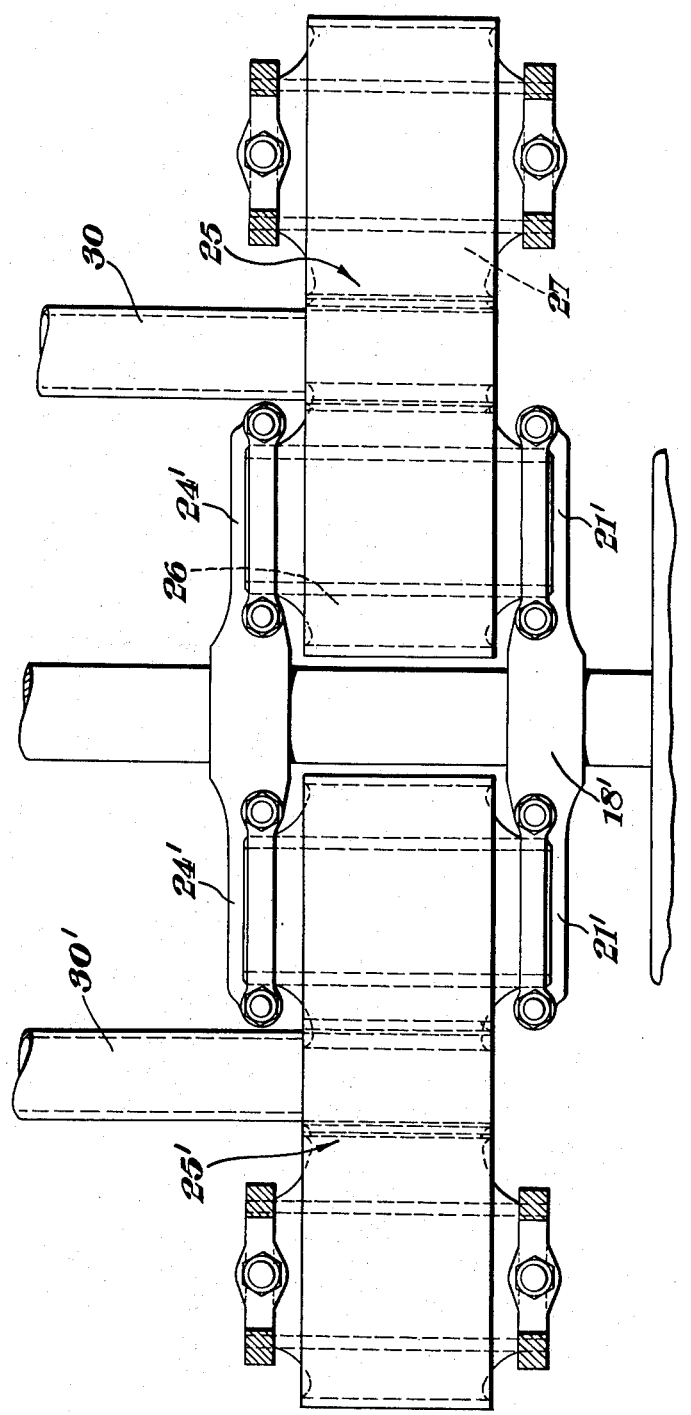

3,097,839
VEHICLE SPRING SUSPENSION SYSTEMS
Archie John Hirst, Leicester, England, assignor to Metalastik Limited, Leicester, England, a British company
Filed Feb. 28, 1961, Ser. No. 92,369
Claims priority, application Great Britain Mar. 22, 1960
14 Claims. (Cl. 267—11)

The present invention relates to vehicle spring suspension systems and concerns axle suspensions for road vehicles, of the kind, hereinafter referred to as of the kind described, including suspension links connecting the axle casing with the chassis of the vehicle through pivot members one at each end of each link, at least one of the pivot members associated with each suspension link being of rubber or the like material, the rubber pivot members resisting angular displacement of the suspension links with change of load on the axle casing in torsion and over at least an upper part of the load range by compression thereof lengthwise of the suspension links.

According to the present invention, there is provided an axle suspension of the kind described comprising a pair of said suspension links extending on the same side of the axle and spaced transversely of the vehicle one on each side of the vehicle, and an anti-roll bar extending between and connected at one end to one of said pair of suspension links and at its other end to the other of said pair of suspension links.

The anti-roll bar not only provides for adequate roll stiffness of the suspension but acts also as a structural member to restrain lateral deflection between the axle and the chassis.

The anti-roll bar may be rigidly connected to the suspension links, in which case roll is accommodated by torsion in the bar in conventional manner. However, the bar is preferably connected to the suspension links by rubber bushes which accommodate the roll in torsion.

In the preferred form, said pair of said suspension links are arranged to be horizontal with respect to the vehicle and in lengthwise compression under tare load conditions on the vehicle, the axle casing being constrained to move substantially vertically in a straight line with respect to the vehicle throughout its deflection range.

This, in well known manner, gives rise to a reduced vertical stiffness for the suspension under tare load conditions.

Preferably also said pair of said suspension links form the sole spring suspension of the axle.

In this case, according to a feature of the present invention, there may be provided, for each one of said pair of suspension links, a pair of control links connected respectively between the chassis and a part mounted on the axle casing, the control links being disposed parallel with one another and extending one on each side of said part. Where this arrangement is adopted, it is preferred that, under full load conditions, said pair of control links are disposed horizontally with respect to the vehicle.

According to an alternative feature of the present invention, the suspension may comprise two pairs of said suspension links and two anti-roll bars, said pairs of said suspension links extending on opposite sides of the axle, the links of each pair being spaced transversely of the vehicle one on each side of the vehicle and the anti-roll bars being connected one between each of said pairs of said suspension links.

By way of example only two specific embodiments of an axle suspension according to the invention, for a commercial road vehicle, will now be described with reference to the accompanying drawings in which:

FIG. 5 is a sectional plan view of FIG. 4.

The figures of drawing show only one side of the suspension. It is to be understood that both sides are identical.

Figure 1:
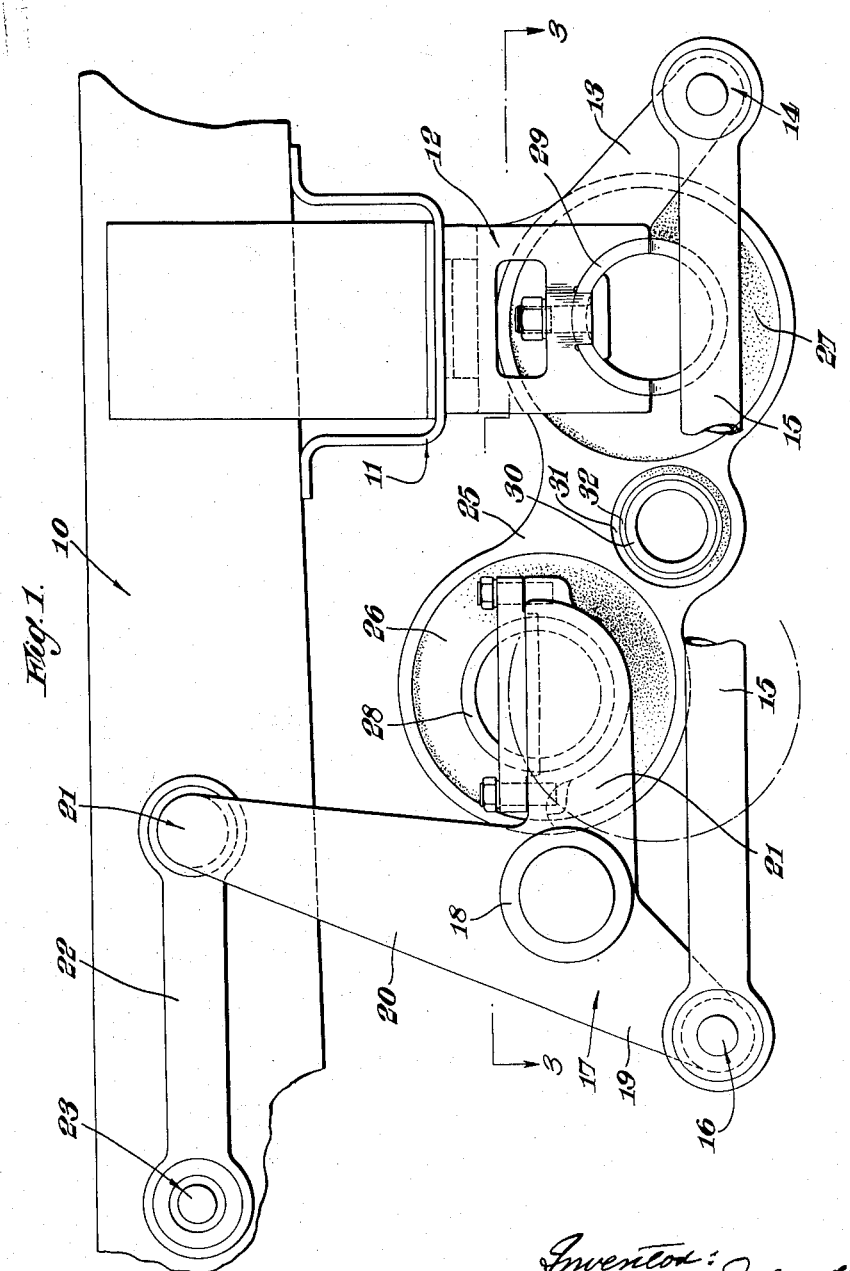
FIG. 1 is a side elevation of the first embodiment.
Figure 2:
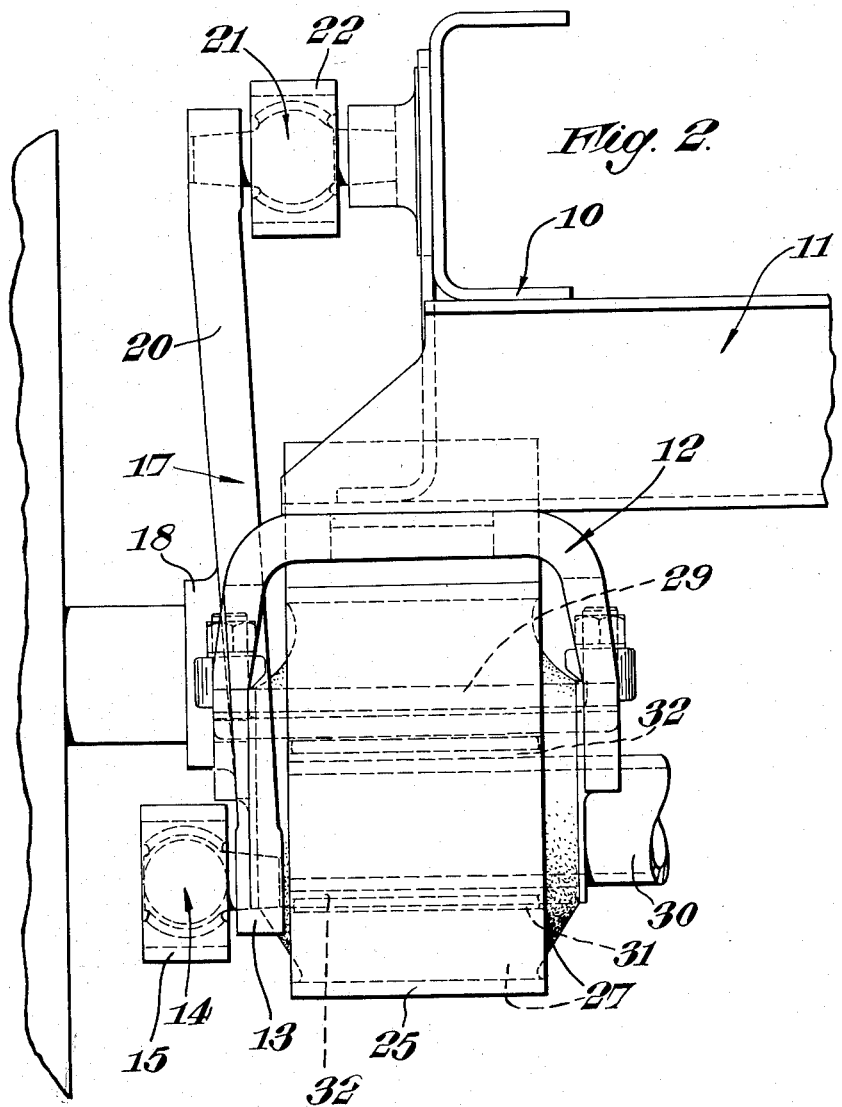
FIG. 2 is a rear end view of the embodiment shown in FIG. 1.
Figure 3:
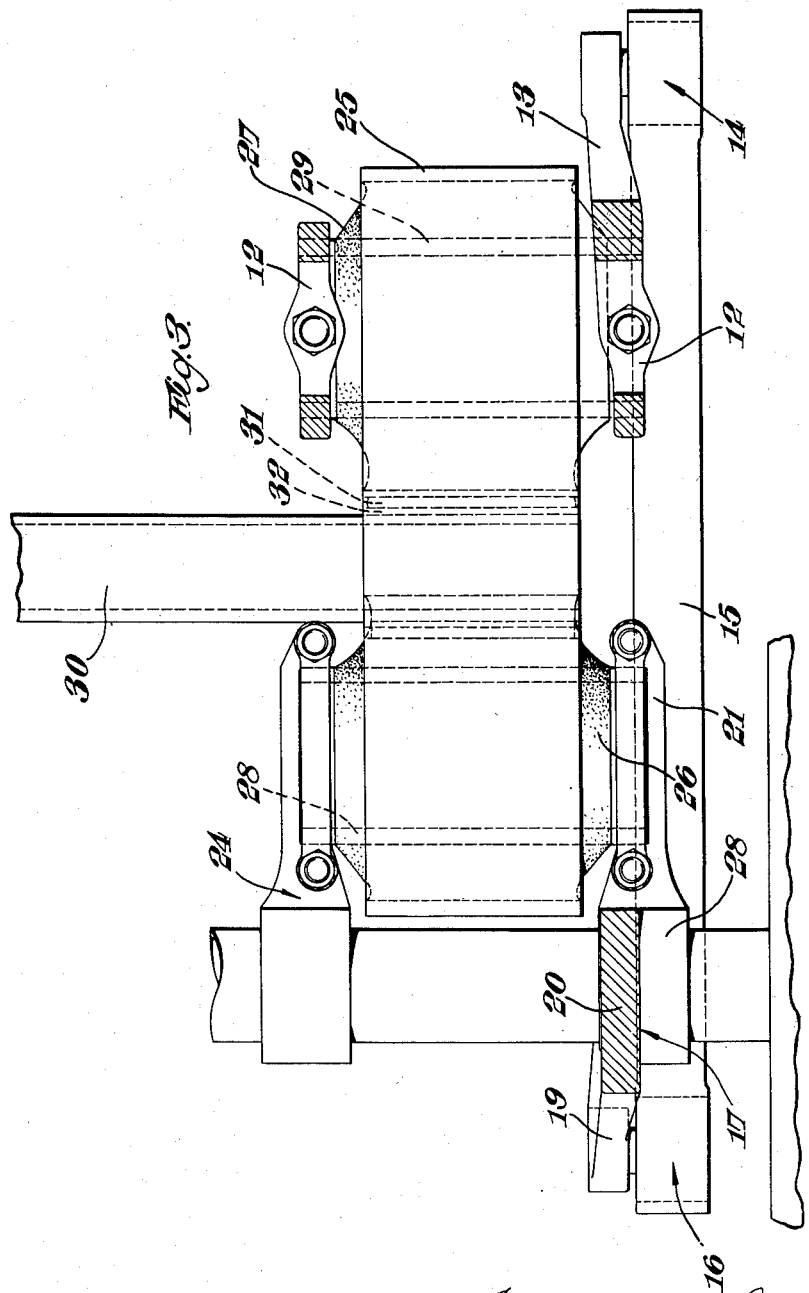
FIG. 3 is a plan view on line 3—3 in FIG. 1.

Referring to FIGS. 1 to 3 of the drawings, the vehicle chassis comprises side frame members 10 and a transverse member 11. Bolted to the transverse member, on each side of the vehicle is a depending fork 12. The outermost of each arm of the forks 12 has a downwardly and rearwardly directed extension arm 13 to which is connected by means of a spherical joint 14 the rear end of a control link 15 attached at its forward end, again by a spherical joint 16, to the lower end of a part 17. The part 17 has a hub portion 18 and three approximately radiating arms 19, 20 and 21.

The part 17 is mounted on the axle casing by means of its hub and the forward end of the link 15 is connected to the arm 19.

The arm 20 is connected by a spherical joint 21 to the rear end of a further control link 22 the forward end of which is pivoted to the side frame member 10 on the appropriate side of the vehicle by a spherical joint 23.

The axle casing carries a further pair of arms 24 which extend parallel with the arms 21.

Mounted between each pair of arms 21 and 24 at one end and in the aligning fork 12 at the other end is a suspension link 25 having rubber pivot members constituted by cylindrical rubber bushes 26 and 27. The bushes 26 and 27 have inner metal sleeves 28 and 29 respectively, the sleeve 28 being fixedly clamped to the arms 21 and 24 and the sleeve 29 being fixedly clamped to the fork 12.

The pair of links 25, which extend on the same side of the axle and which are spaced transversely of the vehicle one on each side of the vehicle are connected by a transverse anti-roll bar 30 which extends between and is connected at one end to one of the links 25 and at the other end to the other of the links 25.

The bar 30 may be rigidly connected to the links 25, but in the present example thin rubber bushes 31 and a sleeve 32 are included between the links and the roll bar.

The control links 15, 22 are disposed parallel with one another and are dimensioned and arranged so that they constrain the axle to move with respect to the vehicle substantially vertically in a straight line.

The links also constrain the sleeve 28 to move substantially vertically in a straight line.

Accordingly, change of vertical load on the axle causing deflection of the axle relative to the chassis and angular adjustment of the links 25 displaces the sleeves 28 and 29 relatively to one another to vary the radial compression in the bushes 26 and 27 in the lengthwise direction of the links. The angular adjustment of the links also varies the torsion in the bushes 26, 27.

Under fully laden conditions the control links 15 and 22 are arranged to be horizontal with respect to the vehicle and the links 25 to be in tension lengthwise thereof, whereby the load on the axle is carried by the bushes 26, 27 in torsion and in radial compression.

Under tare load conditions the links 25 are arranged to be substantially horizontal with respect to the vehicle and in compression lengthwise thereof whereby the load on the axle is carried by the bushes 28, 29 solely in torsion, the compression in the links giving rise to a reduced vertical stiffness between tare and intermediate loading condition in which the links 25 are unstressed in the lengthwise direction. Above the intermediate loading condition the links are tensioned and the resulting radial compression of the bushes gives rise to a rapid stiffening up of the suspension, angular deflection of the links then being resisted by the bushes 26, 27 in torsion and by the compression thereof lengthwise of the links.

It will be seen therefore that the suspension as described has a non-linear load deflection characteristic whereby a useful amount of flexibility is provided at tare with adequate vertical stiffness when fully laden.

The additional roll stiffening provided by the anti-roll bar ensures that cornering forces deflecting the link 25 on the inside of the curve when the vehicle is laden are unable to move the link to an angular position corresponding to a low rate part of its travel where it could be subject to a dangerous amount of further movement.

The anti-roll bar also provides adequate transverse control of the axle, the anti-roll bar acting as a structural member to restrain lateral deflection of the chassis relative to the axle.

The roll bar bushes 31 accommodate the roll in torsion and relative transverse movement between the axle and the chassis is accommodated in direct shear mainly in the bushes 26, 27. Thus the anti-roll bar maintains the links 25 parallel, and horizontal swinging of the links is avoided when the vehicle rolls.

It will be appreciated that the control links 15 and 22 take the reaction of the longitudinal forces in the links 25, the greater part of the horizontal reaction being taken by the upper link 22.

The links 25 are moulded complete with the torsion rubber springs i.e. the bushes 26 and 27 which are bonded to the links and their inner sleeves 28, 29, but the bushes 31 are bonded only to their sleeves 32, the bushes 31 and sleeves 32 being expanded into their housing in the links.

The spherical joints 14, 16, 21 and 23 are of the kind comprising an inner part spherical element, an outer part spherical socket, and an interlayer of rubber bonded to the inner ball and to the socket.

These provide for a high load capacity with small overall dimensions and good freedom of angular movement.

It will be noted that the suspension as described is fastened only to or in the plane of the side members 10 and is located substantially to the rear of the axle.

The suspension may however be located the other way round so as to extend substantially in front of the axle as desired.

In use of the suspension, the axle casing is subjected to a small amount of twist. This does not exceed 1 or 2° however and may easily be accommodated.

Figure 4:
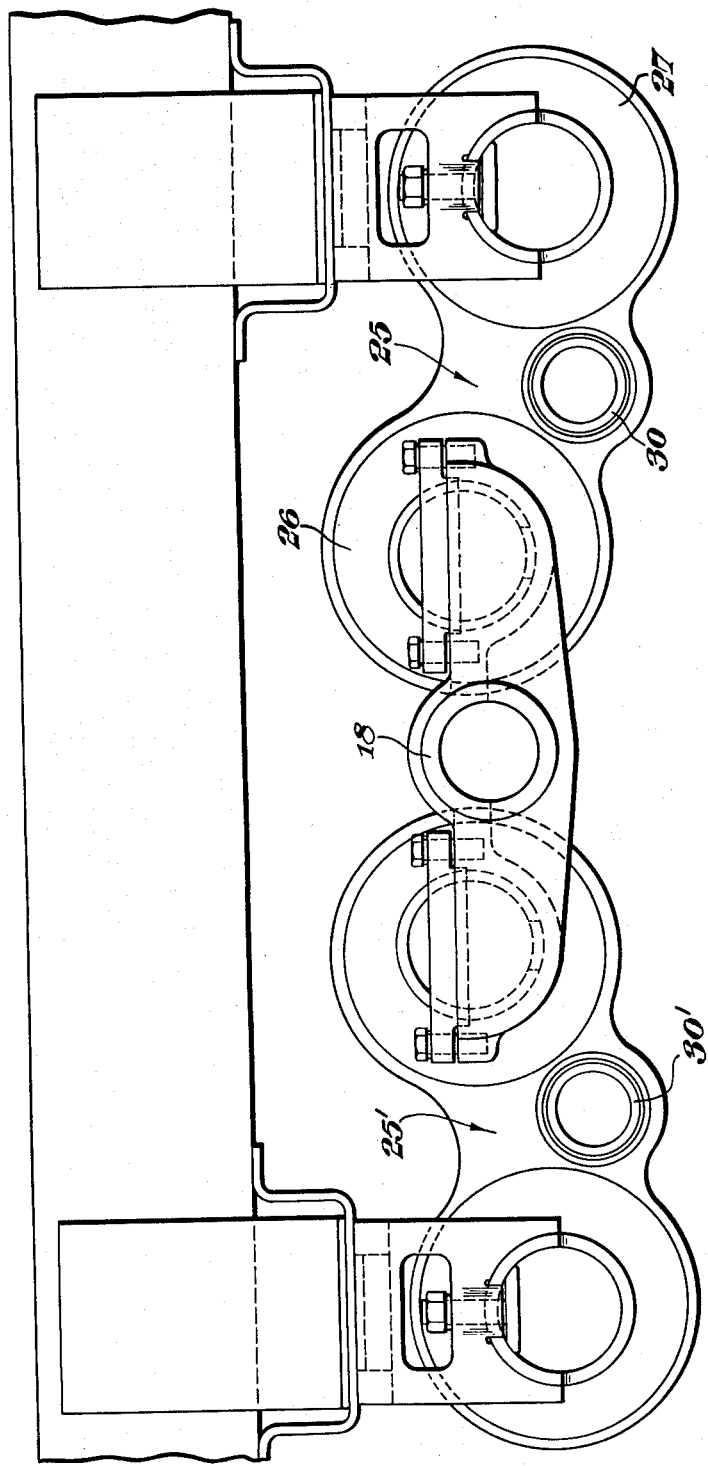
FIG. 4 is a side elevation of the second embodiment.

The control links 15 and 22 and the arms 19, 20 may be dispensed with, these being replaced by a further pair of the links 25 extending on the forward side of the axle and likewise connected between the axle and the chassis as shown in FIGS. 4 and 5 at 25'.

The further pair of links 25' are likewise interconnected by an anti-roll bar 30', and arranged so as to be horizontal with respect to the vehicle under tare load conditions and in line with the rearwardly extending links 25. With this arrangement the axle is constrained to move substantially vertically with respect to the vehicle by the two pairs of links 25, 25'.

I claim:

1. An axle suspension for a road vehicle, comprising an axle casing extending transversely of the vehicle between a pair of road wheels of the vehicle, one on each side of the vehicle, a pair of suspension links extending longitudinally of the vehicle on the same side of the axle casing, said suspension links being spaced apart transversely of the vehicle one on each side of the vehicle, a pivot member connecting one end of each of said suspension links with said axle casing about a transverse pivot axis, a pivot member connecting the other end of each of said links with the vehicle chassis about a transverse pivot axis, at least one of the pivot members associated with each suspension link being of rubber or the like material to resist angular displacement of the suspension link in torsion in the rubber, means interconnecting the vehicle chassis and the axle casing towards each end of the axle casing, said means constraining the axle casing to move relatively to the chassis along a predetermined deflection path under the action of vertical loads on the wheels and, over at least an upper part of the normal loading range of the vehicle and on overload, subjecting the suspension links to lengthwise tension placing the rubber pivot members in compression in the lengthwise direction of the suspension links, and a structural member extending between and connected at one end to one of the suspension links between the pivot members of the link and at its other end of the other of said suspension links between the pivot members of the link to stiffen the suspension against transverse displacement of the vehicle chassis relative to the axle casing and to increase the roll stiffness of the suspension.

2. An axle suspension as claimed in claim 1, wherein said structural member is rigidly connected to said suspension links whereby roll is resisted by torsion in said structural member.

3. An axle suspension as claimed in claim 1, wherein said structural member is connected with said suspension links by rubber bushes which resist the roll in torsion.

4. An axle suspension as claimed in claim 1, wherein under tare load conditions said suspension links are horizontal with respect to the vehicle and in lengthwise compression between their ends, said constraining means constraining the axle casing to move substantially vertical in a straight line with respect to the vehicle throughout its deflection range.

5. An axle suspension as claimed in claim 4, wherein said suspension links form the sole spring suspension of the axle casing.

6. An axle suspension as claimed in claim 5, wherein said constraining means comprises, for each of said suspension links, a pair of control links connected respectively between the chassis and a part mounted on the axle casing, the control links being disposed parallel with one another and extending one on each side of said part.

7. An axle suspension as claimed in claim 6, wherein under full load conditions, said pair of control links are disposed horizontally with respect to the vehicle.

8. An axle suspension as claimed in claim 6 wherein said part is mounted on the axle casing and comprises a central hub with three approximately radiating arms one connected with each of said control links and one connected with the one of said suspension links associated with the control links, with the suspension link through one of the pivot members thereof.

9. An axle suspension as claimed in claim 6, wherein the control links are connected to the chassis and said part by spherical joints of the kind comprising an inner part spherical element, an outer part spherical socket, and an interlayer of rubber or rubber-like material between the inner element and the socket.

10. An axle suspension as claimed in claim 1, wherein both of the pivot members associated with each of said suspension links are of rubber or rubber-like material.

11. An axle suspension as claimed in claim 10, wherein the rubber pivot members are in the form of bushes.

12. An axle suspension for a road vehicle, comprising an axle casing extending transversely of the vehicle between a pair of road wheels of the vehicle, one on each side of the vehicle, a first pair of suspension links extending longitudinally of the vehicle rearwardly from the axle casing, a second pair of suspension links extending longitudinally of the vehicle forwardly of the axle casing, the links of each pair being spaced apart transversely of the vehicle one on each side of the vehicle, a pivot member connecting one end of each link with said axle casing about a transverse pivot axis, a pivot member connecting the other end of each link with the vehicle chassis about a transverse pivot axis, at least one of the pivot members associated with each link being of rubber or the like material to resist angular displacement of the link in torsion in the rubber and, over at least an upper part of the normal loading range of the vehicle and on overload, in compression in the rubber in the lengthwise direction of the link, a structural member extending between said first said pair of suspension links and connected at one end to one link of the pair between the pivot members of the link and at the other end to the other link of the pair between the pivot members of the link to stiffen the suspension against transverse displacement of the vehicle chassis relative to the axle casing and to increase the roll stiffness of the suspension and a second structural member extending between said second pair of suspension links and connected at one end to one link of the pair between the pivot members of the link and at the other end to the other link between the pivot members of the link to stiffen the suspension against transverse displacement of the vehicle chassis relative to the axle casing and to increase the roll stiffness of the suspension.

13. An axle suspension as claimed in claim 12, wherein under tare load conditions on the vehicle said links are horizontal with respect to the vehicle and in lengthwise compression between their ends.

14. An axle suspension as claimed in claim 13, wherein both the pivot members associated with each of said links are formed by rubber bushes.

References Cited in the file of this patent

UNITED STATES PATENTS

| | | |
|---|---|---|
| 2,177,893 | Krotz | Oct. 31, 1939 |
| 2,186,279 | Austin | Jan. 9, 1940 |
| 2,254,261 | Best | Sept. 2, 1941 |

FOREIGN PATENTS

| | | |
|---|---|---|
| 665,282 | Great Britain | Jan. 23, 1952 |
| 1,106,513 | France | July 20, 1955 |